United States Patent
Fusco et al.

(10) Patent No.: US 9,089,839 B2
(45) Date of Patent: Jul. 28, 2015

(54) HIGH-PERFORMANCE COMBUSTION DEVICE AND FLUID CATALYTIC CRACKING PROCESS FOR THE PRODUCTION OF LIGHT OLEFINS

(75) Inventors: Jose Mozart Fusco, Pendotiba (BR); Emanuel Freire Sandes, Icarai (BR); Naiara dos Santos Lages, Laranjeiras (BR); Geovani Aliatti, Taua-Ilha do Governador (BR); Jose Geraldo Furtado Ramos, Ipanema (BR); Ricardo Serfaty, Copacabana (BR); Nelson Patricio Junior, Freguesia-Jacarepagua (BR)

(73) Assignee: PETROLEO BRASILEIRO S.A.-PETROBRAS, Rio de Janeiro (BR)

( * ) Notice: Subject to any disclaimer, the term of this patent is extended or adjusted under 35 U.S.C. 154(b) by 285 days.

(21) Appl. No.: 13/511,316

(22) PCT Filed: Sep. 14, 2010

(86) PCT No.: PCT/BR2010/000297
§ 371 (c)(1),
(2), (4) Date: May 22, 2012

(87) PCT Pub. No.: WO2011/079355
PCT Pub. Date: Jul. 7, 2011

(65) Prior Publication Data
US 2012/0234727 A1 Sep. 20, 2012

(30) Foreign Application Priority Data
Dec. 28, 2009 (BR) .................................. 0905256

(51) Int. Cl.
*B01J 8/18* (2006.01)
*B01J 38/30* (2006.01)
(Continued)

(52) U.S. Cl.
CPC ............... *B01J 29/90* (2013.01); *B01J 29/084* (2013.01); *B01J 29/80* (2013.01); *B01J 38/30* (2013.01);
(Continued)

(58) Field of Classification Search
CPC .......... B01J 8/00; B01J 8/0055; B01J 8/0285; B01J 8/18; B01J 8/1827; B01J 8/1836; B01J 8/1872; B01J 8/24; B01J 8/26; B01J 8/44; B01J 7/00; B01J 19/00; B01J 2208/00398; B01J 29/90; B01J 4/002; B01J 31/40; B01J 38/00; B01J 38/02; B01J 38/04; B01J 38/12; B01J 8/08; B01J 8/12; B01J 8/125; B01J 20/30; B01J 20/34; B01J 21/20; B01J 23/90; B01J 25/00; B01J 25/04; B01J 27/28; C10G 11/14; C10G 11/18; C10G 11/182
USPC ............ 422/129, 139–142, 146; 208/46, 106, 208/113, 118
See application file for complete search history.

(56) References Cited

U.S. PATENT DOCUMENTS 4,274,942 A 6/1981 Bartholic et al.
6,579,820 B2 * 6/2003 Tamhankar et al. ............ 502/20
(Continued)

FOREIGN PATENT DOCUMENTS

CA 1042377 A1 11/1978

OTHER PUBLICATIONS

International Search Report for PCT/BR2010/000297 filed Oct. 19, 2010.

*Primary Examiner* — Natasha Young
(74) *Attorney, Agent, or Firm* — Sughrue Mion, PLLC

(57) ABSTRACT

A combustion device for meeting the energy demand of processes for producing light olefins (ethylene and propene) in fluidized-bed catalytic cracking units. The combustion device is used to burn heating oil and to keep burning the coke deposited on the catalyst, with a view to heating it to meet the energy demand of the reaction, combustion taking place smoothly and uniformly, preventing the formation of hotspots within the catalytic bed and in the dilute phase following combustion (afterburning), thereby minimizing deactivation of the catalyst and the risk of damage to the equipment inside of the combustion device.

28 Claims, 4 Drawing Sheets

(51) Int. Cl.
  *F23C 10/01* (2006.01)
  *B01J 29/08* (2006.01)
  *B01J 29/80* (2006.01)
  *B01J 8/00* (2006.01)
  *B01J 8/24* (2006.01)
  *B01J 8/26* (2006.01)
  *B01J 20/30* (2006.01)
  *B01J 20/34* (2006.01)
  *B01J 21/20* (2006.01)
  *B01J 23/90* (2006.01)
  *B01J 29/90* (2006.01)
  *B01J 38/00* (2006.01)
  *B01J 38/02* (2006.01)
  *B01J 38/04* (2006.01)
  *B01J 38/12* (2006.01)
  *C10G 11/14* (2006.01)
  *C10G 11/18* (2006.01)
  *B01J 29/40* (2006.01)

(52) U.S. Cl.
  CPC ............... *C10G 11/18* (2013.01); *F23C 10/01* (2013.01); *B01J 29/088* (2013.01); *B01J 29/40* (2013.01); *B01J 29/405* (2013.01); *C10G 2300/202* (2013.01); *C10G 2300/205* (2013.01); *C10G 2300/708* (2013.01); *C10G 2400/20* (2013.01)

(56) References Cited

U.S. PATENT DOCUMENTS

2010/0248942 A1* 9/2010 Xu et al. ............... 502/41
2011/0266197 A1* 11/2011 Pinho et al. ............ 208/120.05

* cited by examiner

HIGH-PERFORMANCE COMBUSTION DEVICE AND FLUID CATALYTIC CRACKING PROCESS FOR THE PRODUCTION OF LIGHT OLEFINS

The application is a National Stage of International patent application PCT/BR10/00297, now WO 2011/079355, filed on Sep. 14, 2010, which claims priority to foreign patent application No. BRAZIL PI 0905256-9, filed on Dec. 28, 2009, the disclosures of which are incorporated by reference in their entirety.

This invention relates to the field of processes for producing light olefins in fluidized-bed catalytic cracking units, and it applies to processes in which the thermal energy produced during reactivation of the catalyst by burning coke does not meet the energy demand of the converter. More specifically, this invention describes a high-performance combustion device that can provide heat for the fluid catalytic cracking process used to produce light olefins.

BACKGROUND TO THE INVENTION

Petrochemical FCC is a fluidized-bed catalytic cracking process used to produce light olefins (ethylene and propene), having the following characteristics: the use of feedstock comprising hydrocarbons with a low boiling point (diesel range), highly selective catalyst stock, with a high proportion of zeolite from the pentasil family mixed with type-Y zeolite, a high reaction temperature in a riser reactor; and a quenching section ¼ above the reactor feedstock supply section.

This combination of process conditions generates a high energy demand in the reaction section and production of a very small amount of coke on the catalyst.

As a result, the coke burned in the regenerator, to restore the activity of the catalyst and to generate energy for the process, only provides between 5% and 20% of the total energy required, and heat needs to be added to the process continuously to maintain the heat balance in the converter.

The process for supplying energy involves burning an oil in the fluidized catalytic bed of the combustion device (regenerator).

Accordingly, this invention concerns a process in which the catalyst is regenerated inside a high-performance combustion device, the main energy source for the process, such as to avoid problems such as the occurrence of hotspots in the fluidized catalytic bed of the combustion device or in the afterburning in the dilute phase of the bed, which may cause the permanent deactivation of the catalyst and damage the equipments inside the combustion device.

RELATED TECHNIQUES

In a conventional fluidized-bed catalytic cracking process (FCC), the feedstock comprises hydrocarbons in the diesel range, with or without heavy hydrocarbon residues, as well as the generation of products such as fuel gas, LPG, cracked naphtha, and light and heavy oils, with a carbonaceous deposit or coke forming on the surface of the catalyst. In such cracking units, the reaction is carried out using a catalyst comprising primarily type-Y zeolite and a tubular riser reactor.

If significant quantities of coke are deposited on the catalyst, this catalyst loses activity and selectivity, reducing the yield of the products sought, such as LPG and cracked naphtha. Consequently, on completion of the cracking reactions, inside the riser, the catalytic surface of the catalyst is obstructed by the coke deposits, and requires reactivation. On the other hand, the reaction section requires energy to vaporize the liquid feedstock and to make up for the endothermic catalytic cracking reactions.

To reactivate the catalyst, with a significant coke deposit (spent catalyst), this catalyst is continuously removed from the reaction section, flowing through a stripping bed to remove the hydrocarbons adsorbed in it, through the injection of steam, and from there to a regenerator, where actual reactivation takes place through the combustion reaction of the coke with a gas containing oxygen inside a fluidized bed. Traditionally, air or oxygen-rich air is used to trigger the coke combustion reactions. This process, in addition to restoring catalytic activity, generates sufficient energy to trigger the reactivation of the catalyst, as well as replacing the energy lost through regeneration (energy required to heat the air and the combustion products), and in parallel to supplement the energy required by the reaction section.

When the energy demand of the riser and the energy losses of the regenerator are equal to the quantity of heat released by burning the coke, the unit is said to be heat balanced. When processing feedstocks with high residue contents, the formation of coke deposits is significantly greater and, therefore, the heat generated by burning them is greater than the total heat required by the converter, and the excess heat needs to be removed from the regenerator to restore the heat balance, for example by using heat exchangers outside the regenerator to cool the catalyst.

In the conventional process, either with feedstocks with a high residue content, when in the transient or short stages, such as during preparations to start up the unit, or also in normal operation, where insufficient coke is generated to meet thermal demand, torch oil may be injected, i.e. a quantity of oil is injected into the bed of the regenerator and burns to produce energy to meet the thermal demand of the converter. However, simply injecting torch oil into the bed of the regenerator through a nozzle or a plurality of nozzles causes localized hot spots, which permanently deactivate the catalyst and cause problems of heat stress inside the regenerator, which may damage them, or a combination of both effects.

The continuous burning of oil inside a turbulent FCC fluidized catalytic bed is technically extremely complex, comprising a critical point in the implementation of this process, since neglecting specific performance criteria has a negative impact on the operational reliability and profitability of the unit.

Existing literature describes alternative methods for supplying energy to the bed of the regenerator in order to re-establish the heat balance in FCC units.

U.S. Pat. No. 3,966,587 teaches closely mixing oil with the spent catalyst in a transfer line from the stripper to the regenerator, the mixture flowing under the effect of gravity. According to this method, the joint combustion of the oil and coke deposits in the catalyst avoids the problem of hotspots forming in the regenerator bed and the consequences thereof.

Patent EP 1285042 teaches a method for introducing sufficient torch oil and air to burn the torch oil in an ascending transfer line, in which the diameter of the line is increased to accommodate the speed increase caused by the combustion air supply, with a view to minimizing the harmful results of the use of torch oil directly in the regenerator.

Moreover, U.S. Pat. No. 3,966,587 and EP 1285042 teach how to correct the heat imbalance in conventional FCC units, avoiding the drawbacks inherent in the direct use of torch oil in the regenerator bed. However, these documents do not disclose a solution for promoting the distribution of the emulsion of spent catalyst and oil vaporized or adsorbed in the catalyst, along the cross section of the regenerator, and of the incomplete-combustion products, such as to promote good contact between the remaining gases and emulsion and the oxygen in the bed, promoting the complete combustion of the torch oil inside the bed. On account of the restrictions on speed and local temperature, these methods are only applicable in the presence of minor heat imbalances in the unit, i.e. under conditions that require a small or modest amount of torch oil.

U.S. Pat. No. 7,153,479 discloses a method for removing catalyst from the effluent from an FCC process for producing light olefins. The catalyst is preferably removed by adding and re-circulating fuel oil in a cooling tower, and by washing the catalyst fines from the effluent gases, comprising the recovery of the catalyst in fuel oil through the formation of a slurry (slurry oil).

The formation of this slurry oil makes it possible to supplement the heat balance in FCC units for producing light olefins, in which not enough coke is produced to maintain the heat balance.

However, the method taught in U.S. Pat. No. 7,153,479 does not provide means for completely burning the slurry oil in the catalyst bed. In this case, incomplete-combustion products are outputted from the bed, along with unreacted oxygen, thereby promoting the afterburning in the dilute phase region, with a significant increase in local temperature, contributing to the permanent deactivation of the elutriated catalyst, as well as damage to the equipment inside the regenerator.

The continuous oil combustion process, inside a turbulent FCC fluidized catalyst bed, is a major challenge, because satisfying specific performance criteria, such as the full combustion of the oil inside the fluidized bed, is technically very complex.

Incomplete combustion in the afterburning bed causes the partial combustion of the hydrocarbons in the dilute phase above the bed, resulting in a significant increase in the local temperature and causing serious damage to the internal equipment or cyclones as well as the permanent deactivation of the catalyst that, on account of elutriation, is drawn from the bed in large quantities.

Accordingly, the present invention concerns a process for completely burning the oil inside a fluidized bed, while maintaining the spent-catalyst regeneration conditions and meeting the heat demand of the conversion section of a FCC used to produce light olefins, in a riser, which may have a quenching section, avoiding the problems of hotspots in the bed and afterburning in the dilute phase of the combustion device and the undesirable consequences thereof.

SUMMARY

Broadly speaking, the present invention concerns a high-performance combustion device and a fluidized-bed catalytic cracking process intended to produce light olefins.

In the catalytic cracking process to which the present invention relates, the thermal energy produced during regeneration of the catalyst through combustion of the coke is not sufficient to meet the energy demand of the converter, the spent catalyst being heated and regenerated inside a high-performance combustion device, in which oil combustion is the main energy source for the process.

SHORT DESCRIPTION OF THE FIGURES

DETAILED DESCRIPTION

The present invention concerns a high-performance combustion device, comprising a plurality of lances, in which a heating oil is injected, the burning of which is able to complement the energy demand of a FCC unit.

This heating oil is burned such as to avoid the formation of hotspots inside the fluidized bed of the combustion device and in the dilute phase following combustion (afterburning), minimizing deactivation of the catalyst and the risk of damage to the equipments inside the combustion device.

Another aspect of the invention is a fluid catalytic cracking process intended to produce light olefins, or petrochemical FCC, in which the reactions are processed in an upward flowing tubular reactor or riser over the catalyst containing primarily pentasil zeolite, mixed with type-Y zeolite, potentially exchanged with rare earth elements, in the form of solid particles. In this process, a high-performance combustion device is used to maintain the heat balance, and to promote regeneration of the catalyst.

Figure 1:
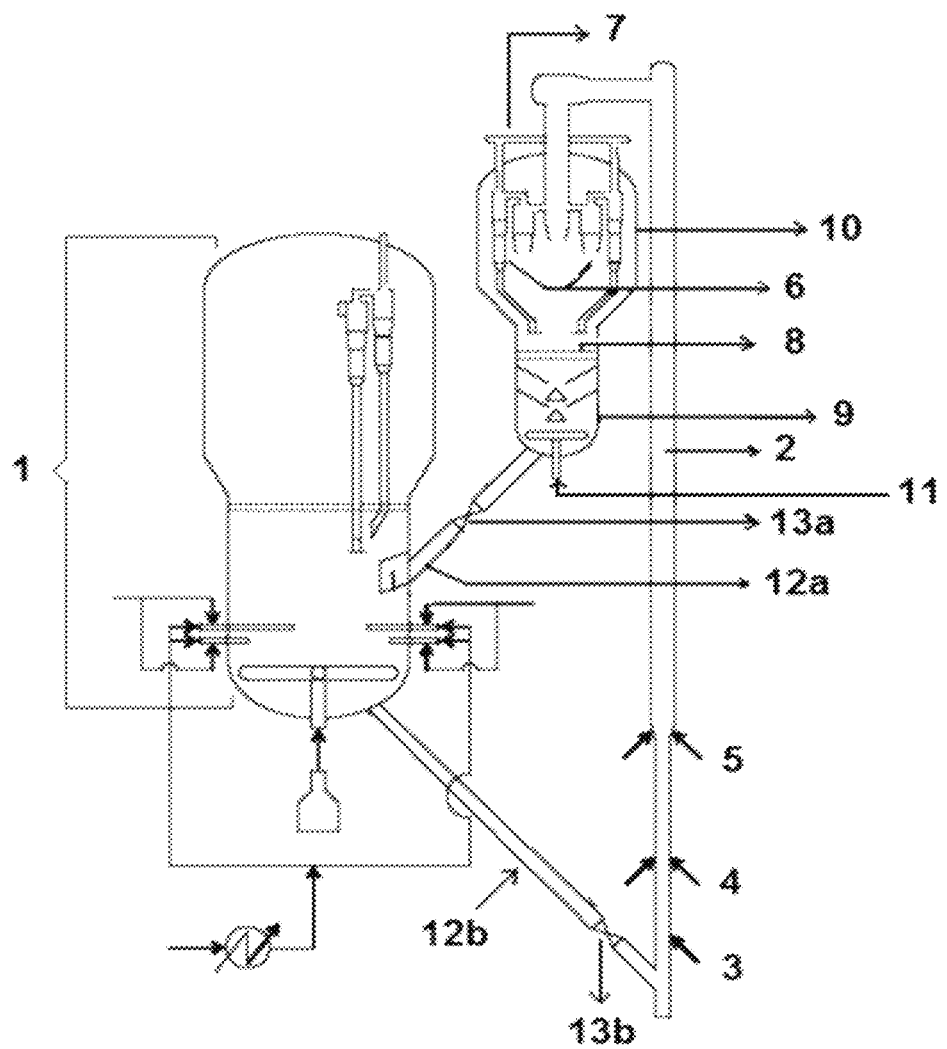
FIG. 1 is a diagram of the fluidized-bed catalytic cracking process or petrochemical FCC for producing light olefins, showing the lower part and the upper part which make up the high-performance combustion device, which is part of said process.

As shown in FIG. 1, a catalyst comprising primarily a zeolite from the pentasil family mixed with a lesser proportion of type-Y zeolite, having a low content of carbon compound or coke coming from the combustion device (1), and heated to a temperature exceeding 700° C., feeds the lower part of the base of an upward flowing tubular reactor or riser (2). A flow of steam (3) is injected above this latter to promote the turbulent fluidization and entrainment of the catalyst and then a hot flow of light hydrocarbons in the diesel range or a feedstock (4) of heavier hydrocarbons is supplied, through a set of radial sprayers that uses steam as the atomization fluid.

The finely dispersed feedstock (4) vaporizes when it comes into contact with the catalyst, triggering the cracking reactions and the generation of products. In order to increase conversion and selectivity for light olefins, a rapid cooling or quenching fluid (5) is supplied ¼ of the way up the riser (2) above the injection point of the feedstock (4).

The cracking reactions continue to occur in the upper section of the injection of the quenching fluid (5) which operates at a temperature of at least 580° C.

The mixture of products and deactivated catalyst passes through a system of cyclones (6) to separate the gaseous products (7) from the catalyst.

The effluent gaseous product (7), rich in light olefins, is fed to the product recovery section and the deactivated catalyst passes through a fluidized bed (8) inside a stripper (9) beneath a separating vessel (10).

The deactivated catalyst flows backwards following injection of the steam (11), to remove the adsorbed hydrocarbons.

The resulting catalyst, containing reduced coke deposits, slightly greater than that of the catalyst supplied to the base of the riser (2), is transferred in dense phase, through a spent-catalyst standpipe (12a) containing a flow-control slide valve (13a) to the combustion device (1). According to the arrangement in FIG. 1, the regenerated catalyst is transferred through a regenerated-catalyst standpipe (12b). This standpipe is inclined and outside the vessel of the combustion device (1), and it contains a flow-control slide valve (13b).

The speed of the steam in the riser (2) must be sufficient to guarantee the stable flow of the catalyst, as it occurs beneath the feedstock (4) injection point. An injection of auxiliary steam, referred to as carrier steam, is used to suspend the catalyst as far as the inlet nozzles of the feedstock (4). Consequently, the liquid feedstock (4) injected close to the base of the reactor or riser (2) is vaporized and reacts, forming products, mainly vaporized, that help to carry the catalyst particles throughout the entire path in the riser (2).

In the section located between ¼ and ¾ of the way up the riser (2), above the injection point of the feedstock (4), a rapid cooling or quenching fluid (5) is injected at a proportion of between 15% and 30% of the mass flow of the feedstock (4), in at least one point, such as to create a second reaction section, intended to promote the production of light olefins by increasing circulation of the catalyst and at the same time by cooling, inhibiting undesirable reactions and simultaneously contributing to the stability of the catalyst flow.

Figure 2:
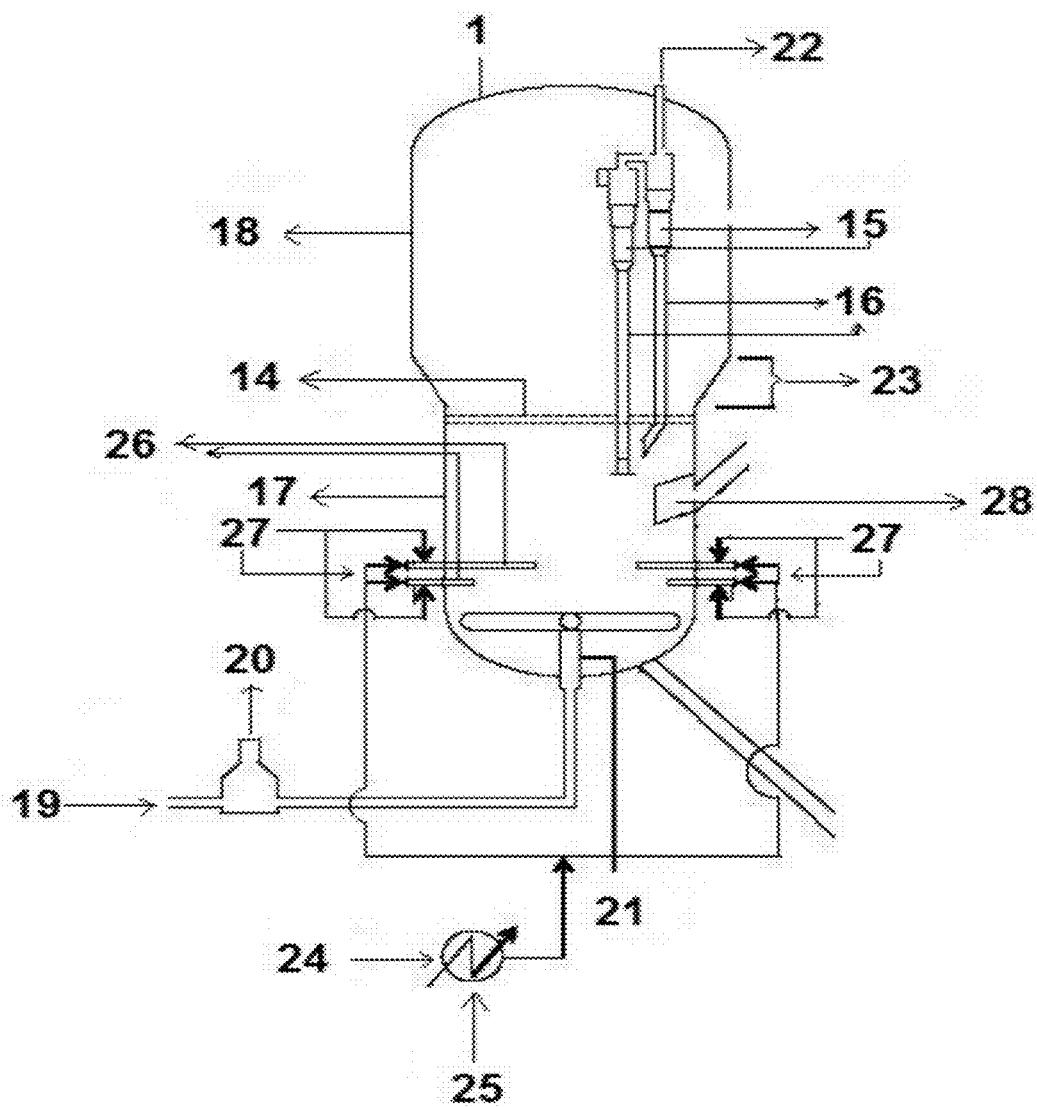
FIG. 2 is a diagram of the high-performance combustion device included in the petrochemical FCC.

The catalyst is reactivated in the combustion device (1) through the combustion reaction of the coke with air inside a turbulent-flow fluidized catalytic bed (14), as shown in FIG. 2. However, the heat released by burning the coke alone is insufficient to maintain the combustion reactions and the heating of the catalyst and to meet the thermal requirements of the reaction, i.e. the sum of the energy of the processes made up by the heating and vaporization of the feedstock, the heating of the products to the reaction temperature and the endothermic reaction heat.

To supply energy to the catalyst, to keep burning the coke or to reactivate and heat the catalyst and to meet the energy demand of the cracking reaction, heating oil is burned inside a combustion device (1).

The heating oil is burned smoothly, uniformly and highly efficiently, avoiding the occurrence of hotspots inside the fluidized bed (14) and in the dilute phase following combustion (afterburning), minimizing deactivation of the catalyst and the risk of damage to equipment inside the combustion device (1), such as cyclones (15) and internal ducts or legs of the cyclones (dip legs) (16), as shown in FIG. 2.

Also according to the illustrations in FIG. 2, the combustion device (1) comprises a vessel with two distinct sections, a lower section (17) and an upper section (18).

The lower section (17) comprises a fluidized catalytic bed (14) under turbulent conditions, caused by the passage of air and combustion products.

Air (19) is supplied to the lower section (17) of the fluidized catalytic bed (14) by one or more pipe-grid air distributors (21). Before being supplied to the pipe-grid distributors, the air is heated by passing it through a furnace (20). This bed (14) operates under turbulent fluidization conditions, and accordingly the lower section (17) of the combustion device (1) is designed to operate with surface velocity of the gas ranging from 0.5 m/s to 1.50 m/s and, preferably, from 0.7 m/s to 1.30 m/s.

The lower section (17) of the fluidized bed (14) of the combustion device (1) has a catalyst inventory to keep the residence time of the gases in combustion between 4 and 10 seconds, and preferably between 5 and 8 seconds.

In the upper section (18) of the combustion device there is a dilute phase where the mixture of catalyst entrained from the fluidized bed (14), by the elutriation process, and the gas resulting from the combustion process of the heating oil supply a system of cyclones (15) to recover the catalyst and return it via ducts or dip legs (16). These ducts connect the lower portion of the cyclones to the fluidized bed (14) to convey the hot gases or combustion gases (22) to an energy recovery system.

The upper section (18) above the fluidized bed (14) of the combustion device (1) has a greater diameter (23) than the lower section (17), such as to reduce the total solids entrained by the cyclones (15). The upper section is designed to operate in a surface velocity range of between 0.6 m/s and 1.10 m/s.

To burn the heating oil inside the fluidized catalytic bed (14) highly efficiently, coverage of the cross section of the combustion device (1) must be maximized.

Maximum coverage is achieved with the highest possible number of supply points, considering the spraying of heating oil in a mist of small droplets and at sufficiently high speed for the jet to reasonably penetrate the particle bed.

This condition is necessary to obtain effective contact between the mist of heating-oil droplets and the heated catalyst in the turbulent fluidized bed and to promote the rapid vaporization of the droplets followed by the combustion reactions of the gaseous hydrocarbon with the air dispersed in bubbles. Depending on the turbulence of the fluidization, the energy released in the combustion is rapidly dissipated inside the fluidized catalytic bed (14).

The heating oil (24), to be burned in the combustion device (1), passes through a heat exchanger (25), to reduce its viscosity to a range of 10 cSt to 15 cSt, to ensure effective atomization in the spray nozzles.

The heating oil (24), after passing through the heat exchanger (25), is distributed through a plurality of lances (26), installed horizontally from the periphery of the lower section (17) of the vessel of the combustion device (1), as also shown in FIG. 2.

To avoid high temperatures or hotspots, one characteristic of the lances (26) is that of having high-performance spray nozzles that consume low quantities of spray fluid (27).

The ratio of spray fluid to heating oil is calculated for a range of 15% to 30% by weight of the heating oil (24). The spray fluid (27) used is steam, however, another fluid could be used instead, for example compressed air, without adversely affecting correct spraying.

Also in the present method, the spent catalyst coming from the stripper (9) is fed into the fluidized bed (14) of the combustion device (1) through a catalyst distributor (28), positioned at a level higher than the lances (26) supplying the heating oil. The catalyst distributor (28) is designed such as to promote the rapid dispersion of the spent catalyst, which is colder, in the hot bed, preventing the formation of dense and cold regions inside the fluidized bed (14) of the combustion device (1).

Figure 3:
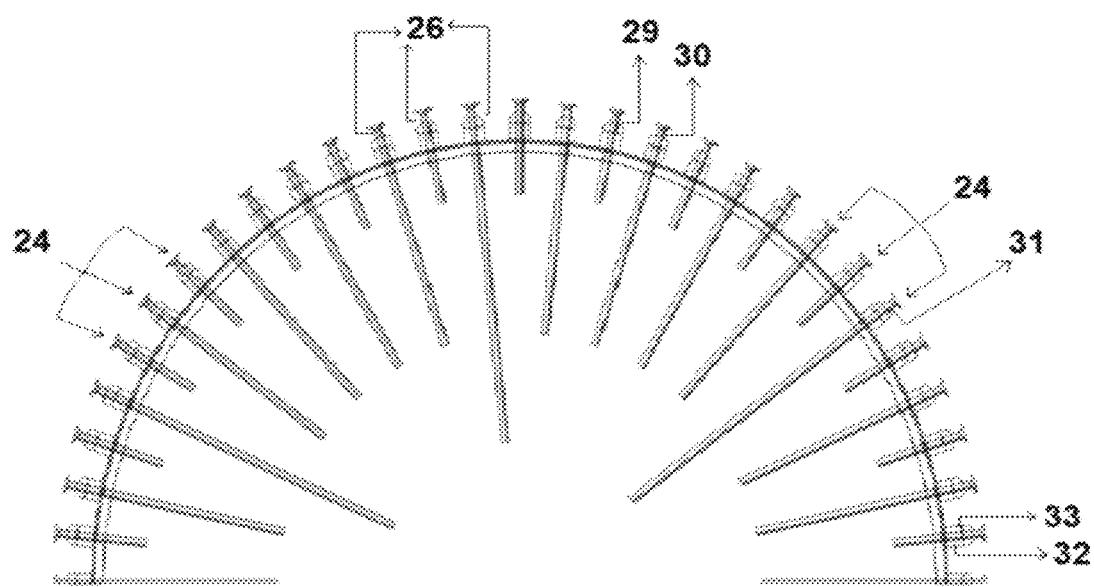
FIG. 3 is a top view of a cross section of the lower section of the combustion device containing lances of different lengths.
Figure 4:
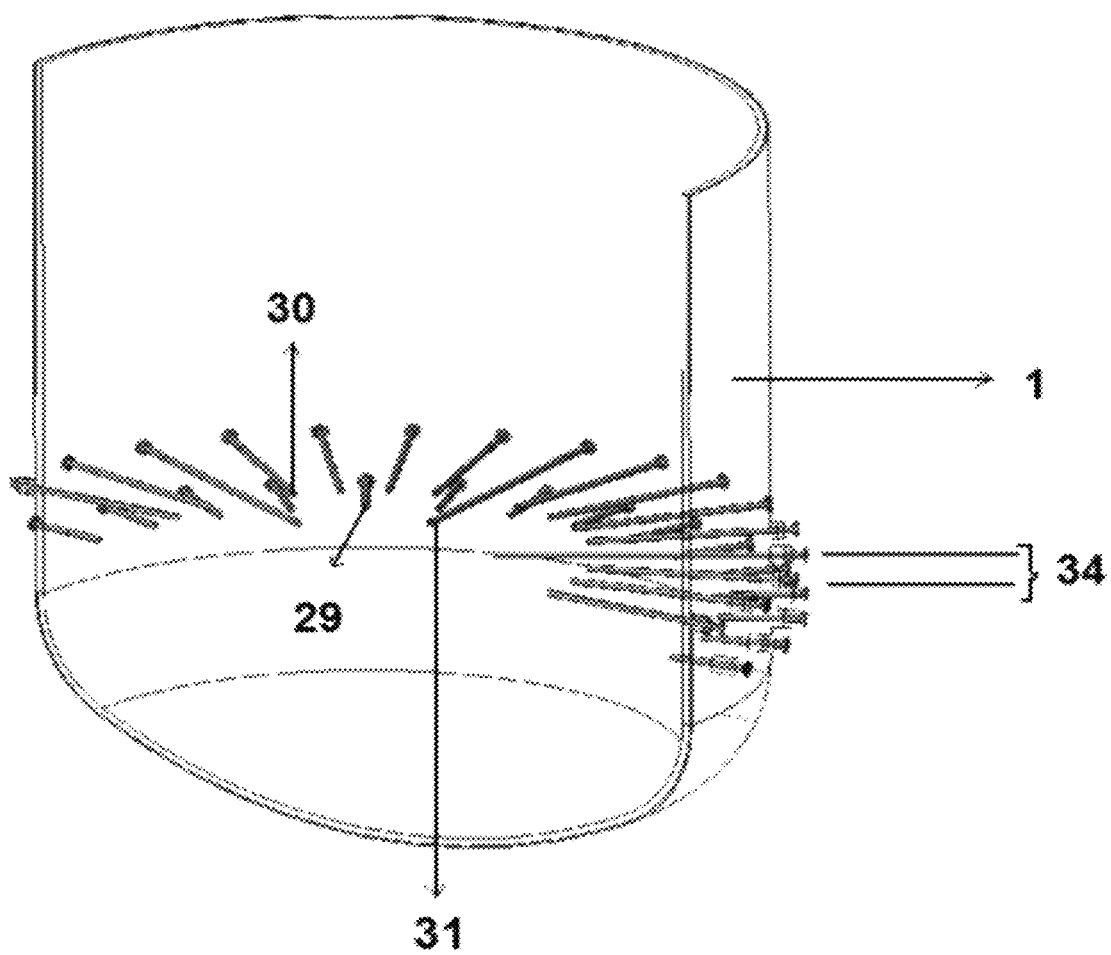
FIG. 4 is a plan view of the lower section of the combustion device comprising different lances placed in the radial part of the bottom of the combustion device at three different heights from the bottom of the high-performance combustion device.

FIG. 3 and FIG. 4 show, respectively, a cross section of the combustion device and a plan view of the different lances (26) of the combustion device.

As shown in the top view, shown in FIG. 3, the heating oil (24) is supplied through a plurality of lances (26), including short (29), medium-length (30) and long (31) lances. The process includes a purge fluid (32) in the annular section formed between the lance (26) and a guide tube (33) (physical protection for the lance).

FIG. 4 shows a three-dimensional view of a half longitudinal section of the lower section of the fluidized bed of the combustion device (1), including short (29), medium-length (30) and long (31) lances (26) placed in the radial part of the bottom of the combustion device (1) at two different heights (34) from the base of the high-performance combustion device (1).

At the top of the riser (2), according to FIG. 1, a series of cyclones (6) separates the catalyst from the reaction products or gaseous products (7). To minimize catalyst losses to the separating vessel (10) in this process, which causes a high gas/particulate solid ratio at the end of the riser (2), as well as to minimize the secondary cracking reactions after the riser inside the separating vessel (10), the cyclone system described in patent applications US 20090142241 A1 and EP 2065458 A1 is used.

As the catalyst promotes cracking reactions throughout the reactor, it is deactivated by the coke deposited on it as a by-product of the reactions.

After the reactor, the deactivated catalyst is firstly stripped by the injection of steam which separates the volatile hydrocarbons, products which were entrained by the catalyst.

Subsequently, the coke deposited on the surface of the catalyst is burned in the combustion device (1), thereby producing the regenerated catalyst, which returns at a high temperature to the base of the reactor, starting a new cycle of process reactions through contact with new feedstock placed in the reactor (2).

This combination of process conditions generates a high energy demand in the reaction section, as well as production of a very small amount of coke on the catalyst. As a result, the coke burned in the combustion device (1) to restore the activity of the catalyst, only provides between 5% and 20% of the total energy required by the converter, and consequently additional energy needs to be provided continuously to ensure the heat balance.

More specifically, the present invention concerns a combustion device able to completely burn a heating oil inside the turbulent fluidized bed (14) of a combustion device (1), such as to minimize the formation of hotspots inside the bed (14) and afterburning reactions in the dilute phase of the upper section (18) of the combustion device (1).

Initially, on account of the use of high-performance cyclone systems developed especially for high particulate contents, at the end of the riser, as described in patent application PI 0704443-7, there is no need to recover catalyst fines from the gaseous products (7) supplying a product recovery and fractionation section. Consequently, the supply of heating oil via lances located in the combustion device (1) according to the present invention has the advantage of being very simple as it is entirely separate from operation of the system of gases at the output of the reactor (1) and operation of the bottom of the separating vessel (10) or stripper (9).

Moreover, the petrochemical FCC converter shown in FIG. 1 has a side-by-side arrangement, i.e. the separating vessel (10), with a stripper (9), and the combustion device (1) are side by side at different heights. In this arrangement, the regenerated catalyst (12b) and spent-catalyst (12a) standpipes are inclined and outside the vessel of the combustion device (1).

The flow-control valves, which are slide valves (13a and 13b) are also outside the combustion device (1). This type of arrangement has the advantage of eliminating several pieces of equipment from inside the combustion device (1) and interference in the oil and catalyst dispersion processes.

The flow pattern for the turbulent fluidized bed (14) in large vessels, such as in petrochemical FCC, has the following characteristics: all of the bubbles generated by the pipe-grid air distributor (21) ascend at high speed, causing the entrainment of the dense emulsion around them, forming a more central region of the vessel (core) characterized by high ascension speed and low density.

The bubbles are separated from the emulsion in the top of the bed (14) and the even denser emulsion recirculates from the top of the bed (14) to the lower section (17), mainly through the region close to the wall, creating a descending annular region (annulus), which returns in the vicinity of the gas distribution device (pipe grid) (21) in the bottom of the bed. This flow pattern therefore forms two different regions inside the fluidized bed (14), an ascending turbulent fluidized region, or core, and a descending dense annular region, or annulus. Experimental studies and simulations have shown that the radius that delimits the ascending region of the core and the descending region in the annulus is approximately 0.65 times the radius of the vessel and appears to be independent of the diameter thereof, for the larger diameters studied.

Another important characteristic of the fluidization process is the dispersion capacity, i.e. the ability to spread the disperse phase over unit of area per unit of time from an arbitrary point of the catalyst bed.

Dispersion is proportional to the degree of fluidization, i.e. greater in regions with greater surface velocity of the gases and, inversely, less in dense regions with a low surface velocity.

Studies on large fluidized beds, between 6 m and 10 m, show that for speeds of around 1.0 m/s, the axial dispersion (in relation to the centreline of the column of the bed) is around 10 times greater than lateral or radial dispersion. Accordingly, any mixture supplied at the level of the air distributor or pipe grid (21) is easily transported in the axial direction to the top of the bed (14) and more slowly in the radial direction along the cross section of the vessel of the combustion device (1)

The heating oil (24) to be burned inside the combustion device (1) is supplied through a plurality of lances (26) installed horizontally from the periphery of the vessel and located in the lower section (17) of the fluidized catalyst bed (14). More specifically, the lances (26) are installed at a level above the balance point between bubble coalescence and burning in the fluidized bed (14), which in the case of vessels in industrial-scale units occurs at a level above 0.50 m of the pipe grid (21), as shown in FIG. 1 and FIG. 4.

A high-performance spray nozzle is installed at the extremity of each lance (26) and the lances (26) are of different lengths in order to promote the full distribution of the heating oil (24) sprayed along the cross section of the combustion device (1), as shown in FIG. 3 and FIG. 4.

The lances (26) are made up of a set of at least two concentric tubes, the inner tube for the segregated supply of the heating oil (24) and the outer tube for the spray fluid (27) of the heating oil (24), which in turn supply different sections of the spray nozzle of the lances (26).

Table 1 sets out an example of lance arrangements assuming three different regions or distribution for a plurality of lances/nozzles for distributing the heating oil (24) in a combustion device (1).

The total number of lances/spray nozzles depends on the area of the cross section of the combustion device (1), the characteristics of the heating oil (24) supplied and the type of oil sprayer.

TABLE 1

| Coverage radius m | Coverage area m$^2$ | Lance length m | Lower level | Upper level |
|---|---|---|---|---|
| 2.0 | 12.2 | 4.0 |  | 6 |
| 3.5 | 27.5 | 2.5 |  | 24 |
| 5.4 | 51.9 | 0.6 | 30 |  |
| Total number of lances in level |  |  | 30 | 30 |
| Total number of lances |  |  | 60 | |

The example in Table 1 assumes the use of a lance/nozzle unit for each 1.88 m² of the cross section of the combustion device (1). On account of the high number of lances (26) distribution over two levels was adopted with half of the lances/spray nozzles per level. Depending on the process conditions, this parameter may vary between one lance/nozzle for each 1.0 m², at least, up to one lance/nozzle for each 5.0 m² of the cross section of the combustion device (1), at most.

Another characteristic of the present method is that the heating oil (24) is supplied to the inside of the turbulent fluidized bed (14) in the form of a mist of small droplets at a level above the pipe-grid air distributor (21), where the turbulent fluidization process is fully established. More specifically, the spray nozzle is able to spray the heating oil (24) in droplets of between 30 μm and 100 μm and the jet of spray fluid and droplets is outputted from the spray nozzle at speeds of between 30 m/s and 60 m/s, in consideration of the cross section of the bubble at the absolute extremity of the nozzle in contact with the fluidized bed.

As is known, the rapid vaporization of liquids in a fluidized bed is related to small droplet size, primarily when associated with jet or bubble injection speeds of between 30 m/s and 60 m/s. Under these conditions, the heat exchange process is extended, reducing the time required to vaporize the droplets and to begin the combustion reactions.

The heating oil (24) is burned in a series of reaction stages, in which the first stage is the most rapid, and the hydrocarbons are converted through a series of elementary oxidization reactions into water and carbon monoxide (CO) followed, with the reduction of the hydrocarbons concentration, by the slower stage that includes the oxidization of CO to $CO_2$.

For the present method, the combustion device (1) operates in a temperature range of between 700° C. and 750° C. and has a sufficient catalyst inventory to completely oxidize the hydrocarbons and the coke into water and $CO_2$ inside the fluidized bed (14), guaranteeing that the residence time of the gases inside the bed (14) is greater than five seconds.

On account of the favourable oil supply and distribution conditions along the cross section of the combustion device, provided by a fine mist of high-speed droplets in the aerated region of the combustion device (1) (ascending core) associated with the extreme turbulence of the fluidized bed, extensive dispersion and heat exchange between the droplets and the medium is achieved, promoting the rapid vaporization and rapid burning of the hydrocarbon vapours of the heating oil (24) when they come into contact with the ascending air bubbles.

In the present method, the heating oil (24) to be burned in the combustion device (1) is heated by passing it through a heat exchanger (25) before it is fed by a plurality of lances (26), keeping the viscosity of the heating oil (24) inside the lances between 5 and 30 cSt, and preferably between 10 and 15 cSt, such as to guarantee high spray efficiency.

The lances (26) are placed inside a physical-protection guide tube (33) and a cleaning or purge fluid (32) is fed into the annular region formed between the outer body of the lance (26) and the guide tube (33).

The spray nozzle of the lances (26) can operate with different fluids, such as steam or air. For example, if the fluid used is steam, the proportion of steam to heating oil is between 0.02 and 0.50 mass/mass and, preferably, between 0.05 and 0.30 mass/mass.

The air used to burn the heating oil (24) and the coke is heated by means of a direct combustion furnace with fuel gas, which heats the air from the blower output temperature to a temperature of between 400° C. and 700° C. and, preferably, between 550° C. and 650° C., before supplying the air distributor of the combustion device (1).

Furthermore, in the present process, the quantity of air supplied to the combustion device for the combustion reactions is greater than that required to satisfy the stoichiometric ratio of the complete combustion, i.e. all of the hydrocarbon material supplied to the combustion device (coke and oil) is transformed into water and carbon dioxide inside the fluidized bed. One way of setting the air supply above that required to satisfy the stoichiometric ratio of the combustion process is using the "excess oxygen in combustion gases" parameter. The combustion gases (22) leaving the upper section (18) of the combustion device (1) for the energy recovery system, therefore, have an excess oxygen content of between 1% and 5.0% molar calculated on the dry basis.

The present process provides means for removing the lances while the unit is in operation, enabling spray nozzles to be replaced in the event of a fault or performance drop thereof.

The heating oil (24) to be used in the combustion device (1) has a low content of contaminants such as nitrogen and sulphur (less than 10 ppm) and metals (sodium, nickel, vanadium, iron), less than 1 ppm, minimizing the emission of polluting gases and contamination of the catalyst stock with metals that cause the loss of catalytic selectivity and activity.

The form and means for facilitating the supply of heating oil (24) to the fluidized bed (14), along with the characteristics of the turbulent dispersion and flow pattern of the fluidized mixture bed; form a set of process conditions that result in the uniform distribution, by means of lances (26) of varying lengths suitably arranged in the lower cross section of the combustion device, of a mist of small oil droplets; facilitated by high-performance sprayers, with a sufficiently high jet speed to ensure efficient contact between the oil droplets and the hot catalyst, enabling the rapid vaporization of the droplets and, consequently, the rapid commencement of the combustion reactions of the hydrocarbons in gaseous phase with the air dispersed in bubbles; an adequate catalyst stock to guarantee the stages of the oxidation reactions, thereby enabling the complete combustion of the heating oil (24) inside the fluidized bed (14), minimizing the risk of hotspots forming and afterburning occurring in the dilute phase.

The invention claimed is:

1. High-performance combustion device, characterized in that it comprises a vessel with two distinct sections, a lower section (17) and an upper section (18), in which the lower section (17) contains a turbulent fluidized catalyst bed (14) in which an oil and the coke of a spent catalyst are burned, with fluidization and burning air (19) supplied to the lower section (17) of the fluidized bed (14) through one or more pipe-grid distributors (21), with a heating oil (24) supplied through a plurality of spray nozzles installed at the extremity of lances (26) located inside the lower section (17) of the fluidized bed (14) above the pipe-grid distributors (21), with the spent catalyst fed through an inclined tubing or spent-catalyst standpipe (12a), with the heated and regenerated catalyst removed from the fluidized bed (14) through a regenerated-catalyst standpipe (12b) located in the lower section (17) of the fluidized bed (14).

2. High-performance combustion device according to claim 1, characterized in that the lower section (17) of the fluidized bed (14) of the combustion device (1) has a lesser diameter (23) than the upper section (18), designed for a surface velocity range of 0.5 m/s to 1.50 m/s.

3. High-performance combustion device according to claim 1, characterized in that the lances (26) are installed horizontally from the periphery of the lower section (17) of the vessel of the combustion device (1), with a minimum proportion of one lance/nozzle for each 1.0 m² and a maximum proportion of one lance/nozzle for each 5.0 m² of cross section of the vessel of the combustion device (1).

4. High-performance combustion device according to claim 1, characterized in that a high-performance spray nozzle is installed at the extremity of each lance (26) and in that the lances (26) are of different lengths in order to facilitate the complete distribution of the heating oil (24) sprayed along the cross section of the combustion device (1).

5. High-performance combustion device according to claim 1, characterized in that the combustion device (1) has short (29), medium-length (30) and long (31) lances (26) located in the radial part of the bottom of the combustion device (1) at two levels (34) at different heights from the bottom of the high-performance combustion device (1).

6. High-performance combustion device according to claim 1, characterized in that the lances (26) comprise a set of at least two concentric tubes for the segregated supply of heating oil (24) and spray fluid (27), which in turn supply different sections of the spray nozzle of the lance (26).

7. High-performance combustion device according to claim 1, characterized in that the lances (26) are placed inside a physical-protection guide tube (33), with a cleaning or purge fluid (32) being fed into the annular region formed between the outer body of the lance (26) and the guide tube (33).

8. High-performance combustion device according to claim 1, characterized in that the lower section (17) of the fluidized bed (14) of the combustion device (1) has a catalyst inventory to keep the residence time of the gases in combustion between 4 and 10 seconds.

9. High-performance combustion device according to claim 1, characterized in that a greater proportion of the carbon of the heating oil (24) and of the coke from the spent catalyst is fully burned into carbon dioxide inside the fluidized bed (14), in the lower section (17) of the combustion device (1), at a temperature of between 700° C. and 750° C.

10. High-performance combustion device according to claim 1, characterized in that the spray nozzles of the lances (26) of the combustion device (1) use a spray fluid (27) at a proportion of between 15% and 30% by weight of the heating oil (24).

11. High-performance combustion device according to claim 1, characterized in that the spray nozzles of the lances (26) of the combustion device (1) produce a jet of spray fluid at speeds of between 30 m/s and 60 m/s.

12. High-performance combustion device according to claim 1, characterized in that the spray nozzles of the lances (26) of the combustion device (1) use steam as the spray fluid (27).

13. High-performance combustion device according to claim 12, characterized in that the spray nozzles of the lances (26) of the combustion device (1) use a spray fluid (27) for the heating oil (24) with a proportion of steam to heating oil of between 0.02 and 0.50 mass/mass.

14. High-performance combustion device according to claim 12, characterized in that the spray nozzles of the lances (26) of the combustion device (1) use a spray fluid (27) for the heating oil (24) with a proportion of steam to heating oil of between 0.05 and 0.30 mass/mass.

15. High-performance combustion device according to claim 1, characterized in that the heating oil (24) to be used in the combustion device (1) has a nitrogen and sulphur content of less than 10 ppm and a metal content (sodium, nickel, vanadium, iron) of less than 1 ppm.

16. High-performance combustion device according to claim 1, characterized in that the spray nozzles of the lances (26) of the combustion device (1) are able to spray heating oil (24) in droplets of between 30 μm and 100 μm.

17. High-performance combustion device according to claim 1, characterized in that the combustion gases (22) leaving the upper section (18) of the combustion device (1) for the energy recovery system have an excess oxygen content of between 1% and 5.0% molar calculated on the dry basis.

18. High-performance combustion device according to claim 1, characterized in that the air (19) is heated, before being supplied to the pipe-grid distributor (21) of the combustion device (1), using an air furnace (20) to a temperature of between 400° C. and 700° C.

19. High-performance combustion device according to claim 1, characterized in that the upper section (18) of the combustion device (1) includes a system of cyclones (15) to recover the catalyst and return it to the fluidized bed (14) through the legs of the cyclones or dip legs (16) and outlet ducts to transfer the combustion gases (22) to an energy recovery system.

20. High-performance combustion device according to claim 1, characterized in that the heating oil (24) is heated using a heat exchanger (25) before being fed through the plurality of lances (26), keeping the viscosity of the heating oil (24) inside the lances between 5 and 30 cSt.

21. Catalytic cracking process, characterized by a side-by-side arrangement of the entire installation for the process undertaken, in which a separating vessel (10) coupled to a lower stripper (9) and a combustion device (1) are side-by-side at different heights, and in that, in this arrangement, a regenerated-catalyst (12b) and spent-catalyst (12a) standpipes are inclined and outside the vessel of the combustion device (1), wherein the combustion device (1) is the high-performance combustion device according to claim 1.

22. Catalytic cracking process according to claim 21, characterized in that the catalyst is regenerated inside the high-performance combustion device (1).

23. Catalytic cracking process according to claim 21, characterized in that the spent catalyst coming from the stripper (9) is fed into the fluidized catalytic bed (14) of the combustion device (1) through a catalyst distributor (28), positioned at a higher level than the lances (26) supplying the heating oil (24).

24. Catalytic cracking process according to claim 21, characterized in that the reactions occur over the catalyst containing primarily pentasil zeolite, mixed with type-Y zeolite, potentially exchanged with rare earth elements, in the form of solid particles.

25. High-performance combustion device according to claim 1, characterized in that the lower section (17) of the fluidized bed (14) of the combustion device (1) has a lesser diameter (23) than the upper section (18), designed for a surface velocity range of 0.7 m/s to 1.30 m/s.

26. High-performance combustion device according to claim 1, characterized in that the lower section (17) of the fluidized bed (14) of the combustion device (1) has a catalyst inventory to keep the residence time of the gases in combustion between 5 and 8 seconds.

27. High-performance combustion device according to claim 1, characterized in that the air (19) is heated, before being supplied to the pipe-grid distributor (21) of the combustion device (1), using an air furnace (20) to a temperature of between 550° C. and 650° C.

28. High-performance combustion device according to claim 1, characterized in that the heating oil (24) is heated using a heat exchanger (25) before being fed through the plurality of lances (26), keeping the viscosity of the heating oil (24) inside the lances between 10 and 15 cSt.

\* \* \* \* \*